US010863509B2

(12) United States Patent
DiGregory, Jr.

(10) Patent No.: US 10,863,509 B2
(45) Date of Patent: Dec. 8, 2020

(54) SYSTEMS AND METHODS FOR FREQUENCY HOPPING WAVEFORMS

(71) Applicant: Raytheon Company, Waltham, MA (US)

(72) Inventor: August A. DiGregory, Jr., Fort Wayne, IN (US)

(73) Assignee: Raythen Company, Waltham, MA (US)

( * ) Notice: Subject to any disclaimer, the term of this patent is extended or adjusted under 35 U.S.C. 154(b) by 0 days.

(21) Appl. No.: 16/939,711

(22) Filed: Jul. 27, 2020

(65) Prior Publication Data
US 2020/0359382 A1    Nov. 12, 2020

Related U.S. Application Data

(62) Division of application No. 16/133,966, filed on Sep. 18, 2018, now Pat. No. 10,728,896.
(Continued)

(51) Int. Cl.
*H04W 72/04* (2009.01)
*H04K 3/00* (2006.01)
(Continued)

(52) U.S. Cl.
CPC ........ *H04W 72/0453* (2013.01); *H04B 1/713* (2013.01); *H04K 3/25* (2013.01);
(Continued)

(58) Field of Classification Search
CPC . H04W 72/0453; H04K 3/25; H04K 2203/36; H04B 1/713; H04B 2001/71365; H03M 13/27; H03M 13/2703
(Continued)

(56) References Cited

U.S. PATENT DOCUMENTS 4,630,282 A    12/1986  Landers et al.
5,166,953 A    11/1992  Hershey et al.
(Continued)

FOREIGN PATENT DOCUMENTS

CN         1595826 A      3/2005

OTHER PUBLICATIONS

International Preliminary Report on Patentability dated Jul. 2, 2020 for International Application No. PCT/US2018/067002; 9 Pages.
Andrew, "It Still Works—How to Increase Router Bandwidth;" Retrieved from http://itstillworks.com/increase-router-bandwidth-25417.html; Updated Sep. 18, 2017; 4 Pages.
(Continued)

*Primary Examiner* — Shaima Q Aminzay
(74) *Attorney, Agent, or Firm* — Daly, Crowley, Mofford & Durkee, LLP (57) ABSTRACT

Systems and methods for reprogramming a Single Channel Ground and Airborne Radio System (SINCGARS) having a SINCGARS frequency-hopping waveform with a fixed retuning period operable in a network of SINCGARS. A system includes a controller programmed with a modified frequency-hopping waveform having one or more retuning periods, each of the one or more retuning periods being shorter in duration than the fixed retuning period of the conventional SINCGARS waveform, the modified frequency-hopping waveform compatible with each of the SINCGARS in the network. An interface is provided for programming each of the devices with the modified waveform.

12 Claims, 7 Drawing Sheets

Related U.S. Application Data (60) Provisional application No. 62/609,829, filed on Dec. 22, 2017.

(51) Int. Cl.
*H04B 1/713* (2011.01)
*H04B 1/7136* (2011.01)

(52) U.S. Cl.
CPC .............. *H04B 2001/71365* (2013.01); *H04K 2203/36* (2013.01)

(58) Field of Classification Search
USPC ............................................................ 455/1
See application file for complete search history.

(56) References Cited

U.S. PATENT DOCUMENTS

| | | | |
|---|---|---|---|
| 6,018,543 A * | 1/2000 | Blois | .................... H04B 1/1027 375/133 |
| 8,428,100 B2 | 4/2013 | Franceschini et al. | |
| 2009/0257474 A1 | 10/2009 | Tuttle | |
| 2016/0381490 A1 | 12/2016 | Rico Alvarino et al. | |

OTHER PUBLICATIONS

Energy Harvesters LLC, *Executive Summary*; www.energyharvesters.com; Jan. 2017; 1 Page.
Energy Harvesters LLC, *Product Description*; www.energyharvesters.com; Jan. 2017; 1 Page.
MX•COM, Inc., "Increasing Data Throughput in Radio Telemetry Systems;" Mixed Signal ICs, Application Note; www.mxcom.com; Doc. No. 20830114.001; Jan. 1998; 6 Pages.
Search Report and Written Opinion of the ISA dated Mar. 26, 2019 for International Application No. PCT/US2018/067002; 14 Pages.
U.S. Appl. No. 16/133,966, filed Sep. 18, 2018, DiGregory, Jr.
Restriction Requirement dated Aug. 29, 2019 for U.S. Appl. No. 16/133,966; 8 Pages.
Response to Restriction Requirement dated Aug. 29, 2019 for U.S. Appl. No. 16/133,966; Response filed on Sep. 26, 2019; 1 Page.
U.S. Non-Final Office Action dated Oct. 21, 2019 for U.S. Appl. No. 16/133,966; 12 Pages.
Response to U.S. Non-Final Office Action dated Oct. 21, 2019 for U.S. Appl. No. 16/133,966; Response filed on Jan. 17, 2020; 11 Pages.
Notice of Allowance dated Apr. 6, 2020 for U.S. Appl. No. 16/133,966; 16 Pages.

* cited by examiner

SYSTEMS AND METHODS FOR FREQUENCY HOPPING WAVEFORMS

RELATED APPLICATIONS

This application is a divisional of U.S. application Ser. No. 16/133,966 filed Sep. 18, 2018 and entitled "SYSTEMS AND METHODS FOR FREQUENCY HOPPING WAVEFORMS" which claims the benefit of U.S. Provisional Application No. 62/609,829, filed on Dec. 22, 2017, entitled "Systems and Methods for Frequency Hopping Waveforms." All applications are hereby incorporated herein by reference in their entireties.

BACKGROUND

Jamming can be a major impediment to the operational performance of communication systems. Jamming involves targeting the transmission frequencies of communications with noise, or other content, to effectively block those communications. Jamming can first involve scanning frequencies for discernable signals followed by selectively targeting the detected frequencies. In response, communication systems have been developed that frequency hop between different frequencies in order to avoid detection and to make jamming more difficult. When hopping between different frequencies, time is needed during a hop to retune and settle at a different frequency before communications can resume. The mode and waveform utilized within a frequency-hopping network is generally established between the devices so that they can effectively communicate.

One such frequency-hopping system commonly utilized for communicating is the Single Channel Ground and Airborne Radio System (SINCGARS). SINCGARS utilizes a known waveform including a fixed retune period and fixed dwell period (during which signals at the tuned frequency are sent and received) as the signal hops between different frequencies. SINCGARS has been widely adopted such as within military networks. However, SINCGARS has drawbacks due to the predictability of fixed dwell and retuning periods and improved jamming systems that have made detection and jamming frequency-hopping signals more effective.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a system for frequency-hopping in a network of devices configured with a fixed retuning period such SINCGARS.

In an aspect of embodiments, in a Single Channel Ground and Airborne Radio System (SINCGARS) having a SINCGARS frequency-hopping waveform with a fixed retuning period operable in a network of SINCGARS, a system is provided including a controller programmed with a modified frequency-hopping waveform having one or more retuning periods, each of said one or more retuning periods being shorter in duration than the fixed retuning period of the conventional SINCGARS waveform, said modified frequency-hopping waveform compatible with each of the SINCGARS in the network and an interface for programming each of the devices with the modified waveform.

In an embodiment, the modified waveform has a plurality of retuning periods, each of said plurality of retuning periods being shorter in duration than the fixed retuning period of the conventional SINCGARS waveform.

In an embodiment, the duration of the sum of the plurality of retuning periods in the modified waveform equals the same overall duration as the fixed retuning period of the conventional SINCGARS waveform.

In an aspect of embodiments, a system is provided for improving radio frequency (RF) frequency-hopping in a network of devices configured with an original waveform having fixed retuning period. The system includes a controller programmed with a modified frequency-hopping waveform having one or more modified retuning periods compatible with each of the devices in the network, each of the modified retuning periods shorter in duration than the fixed retuning period of the original waveform and an interface for programming each of the devices with the modified waveform.

In an embodiment, the modified waveform has the same overall duration as the original waveform having a fixed retuning period.

In an embodiment, the modified waveform includes one or more modified dwell periods during which each of the devices is configured to receive or transmit a selected RF frequency. In an embodiment, at least one of the one or more dwell periods is adaptive. In an embodiment, the one or more dwell periods is pseudo-randomly modulated.

In an embodiment, the original RF frequency-hopping waveform is a waveform of the SINCGARS communication system.

In an embodiment, the modified waveform increases the data throughput of the SINCGARS waveform by at least about 20%.

In an embodiment, the retuning period of the modified waveform is divisible into the retuning period of the original waveform by an integer greater than 1.

In an aspect of embodiments, a method for improving radio frequency (RF) frequency-hopping in a network of devices configured with a waveform having a fixed retuning period is provided. The method includes assembling a network of RF frequency-hopping devices, configured with an original waveform having a fixed returning period and reprogramming the frequency-hopping devices with a modified waveform having a retuning period shorter in duration than the fixed retuning period of the original waveform.

In an embodiment, the modified waveform comprises one or more dwell periods during which each of the devices is configured to receive or transmit a selected RF frequency. In an embodiment, the dwell period is pseudo-randomly modulated. In an embodiment, the one or more dwell periods are adaptive.

In an aspect of embodiments, a method is provided that includes assembling a network of radio frequency (RF) frequency-hopping devices in a network of devices configured with an original string of multiple waveforms. Here, each waveform operates on a distinct frequency and comprises a fixed retuning period and a dwell period. The method also includes reprogramming the frequency-hopping devices with a modified string of waveforms. Generating the modified string of waveforms comprises dividing each waveform of the original string into two or more sub-hops, wherein each sub-hop includes a portion of the fixed retuning period and a portion of the dwell period. Generating the modified string also comprises interleaving each sub-hop such that sub-hops operating on a same frequency are time-dispersed.

Advantageously, aspects of the present disclosure increase anti-jam (AJ) capabilities of frequency-hopping devices. The devices have an increased hop rate which makes it difficult for adversaries to detect and jam communication signals. For instance, adversaries cannot easily detect, and jam synchronization preambles used to synchronize communications between frequency-hopping devices. Additionally, interleaved synchronization messages increase the probability of the frequency-hopping devices detecting the synchronization messages. The interleaved synchronization also allows synchronization information and data, normally conveyed during a hop, to be conveyed during multiple time-dispersed hops. Such interleaving increases receiver frequency-hopping devices' probability of detecting and establishing communication sessions.

In another aspect of embodiments, a system is provided that includes a network of radio frequency (RF) frequency-hopping devices in a network of devices configured for operation with an original string (or sequence) of multiple waveforms, wherein each waveform operates on a distinct frequency and comprises a fixed retuning period and a dwell period. The system also includes a controller configured to enable the frequency-hopping devices to operate with a modified string of waveforms. The controller generates the modified string of waveforms by dividing each waveform of the original string into two or more sub-hops, wherein each sub-hop includes a portion of the fixed retuning period and a portion of the dwell period. Additionally, the controller generates the modified string of waveforms by interleaving each sub-hop such that sub-hops operating on a same frequency are time-dispersed.

In an embodiment, a combination of at least two sub-hops has an overall duration equivalent to that of a single waveform of the string of original waveforms.

In an embodiment, each sub-hop comprises a synchronization preamble having a length and/or time duration proportional to a number of divisions of each waveform of the original string.

In an embodiment, information transmitted in the dwell period of an original waveform is divided such that each waveform division is interleaved with one of the dwell portions of each of the two or more sub-hops operating on the same frequency. The information can also be time-dispersed with each of the two or more sub-hops operating on the same frequency.

In an embodiment, each waveform of the original string of multiple waveforms is a waveform of a Single Channel Ground and Airborne Radio System (SINCGARS).

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

DETAILED DESCRIPTION

Described embodiments are directed to systems and methods for reconfiguring frequency-hopping waveforms used in networks of devices configured with a fixed retuning period such SINCGARS.

Figure 1:
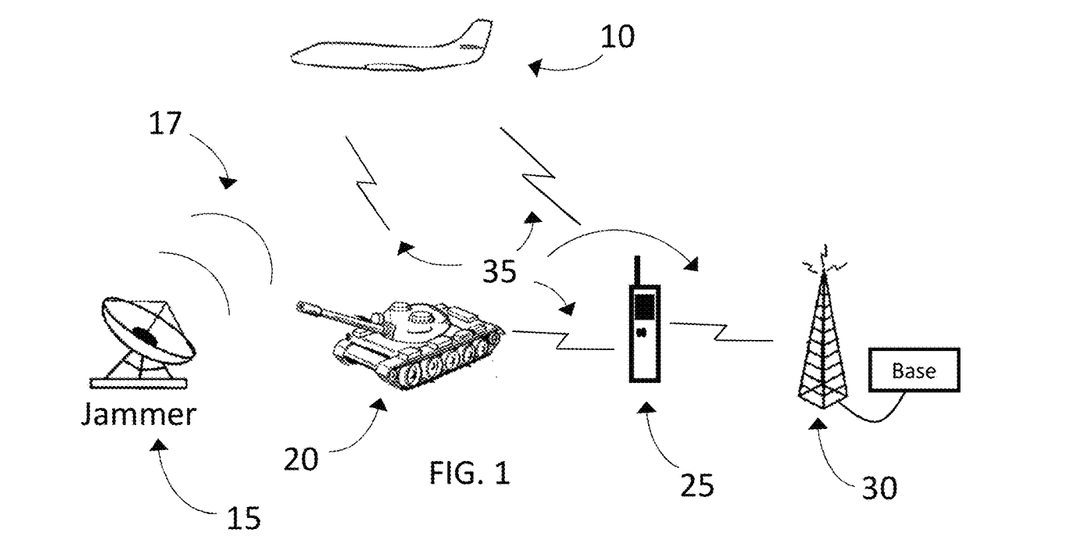
FIG. 1 is an illustrative block diagram of channels of communication and jamming between mobile and fixed platforms.

Referring to FIG. 1, an illustrative block diagram of channels of communication and jamming between mobile and fixed platforms is shown. In a common scenario involving frequency-hopping communications, various communication devices (e.g., a handheld radio 25) within both mobile and stationary platforms including, for example, a plane 10, tank 20, and base 30 are preconfigured to utilize an established frequency-hopping waveform such as SINCGARS. The various communication devices can then communicate via frequency-hopping signals 35 between each other. When deployed, the communications devices may encounter jamming signals 17 from a jamming signal emitter 15, which may attempt to detect and interrupt signals at selected or detected frequencies.

It should be appreciated that in an illustrative embodiment, software which implements the techniques described herein may be loaded in existing radios or devices operating in accordance with a SINCGARS protocol and such software may: (1) provide a user interface to select (e.g. via one or more menus) improved modes of radio (or device) operation (such improved modes of operation will be described in detail herein below); and (2) implement such improved modes of operation. It should also be appreciated that in illustrative embodiments, if one or more radios in a network isn't as capable hardware-wise as one or more other radios in the network, all of the radios may be configured, (e.g. through menu selections on each radio), to the capability of the least capable radio in the network. For example, if one radio in a network is capable of hopping three times faster than the original SINCGARS waveform and four radios in the network are capable of hopping twenty-four times faster than the original SINCGARS waveform, all of the radios in the network would be configured to hop three times faster than the original SINCGARS waveform. If the least capable radio were removed from the network, the other radios could be configured to hop at one of the faster rates.

Figure 2:
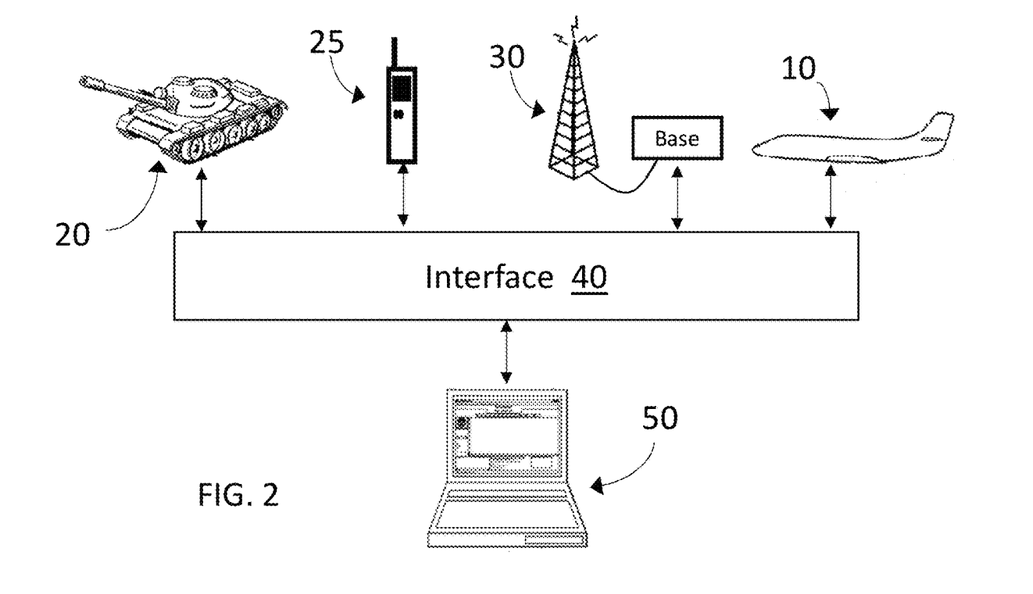
FIG. 2 is an illustrative block diagram of a system and interface for configuring platforms of communication with a frequency-hopping waveform according to described embodiments.

Referring to FIG. 2, an illustrative block diagram of a system 50 and interface 40 for configuring platforms of communication with a frequency-hopping waveform is provided. In one aspect, an interface 40 is provided for configuring the communication devices within the different platforms (e.g., plane 10, base 30, handheld radio 25, and tank 20) to operate according to a new frequency-hopping waveform in accordance with described embodiments.

A system 50 can be a server or similar computer system that is connected to the interface for communicating the new configuration with the frequency-hopping waveform to various communication devices such as shown. In embodiments, the configuration is a modification of a previously established frequency-hopping waveform (e.g., SINCGARS) such as further described herein. Once a new configuration/modified frequency-hopping waveform is configured within each of the communication devices, the communication devices can communicate in accordance with the new, modified frequency-hopping waveform/configuration.

Figure 3:
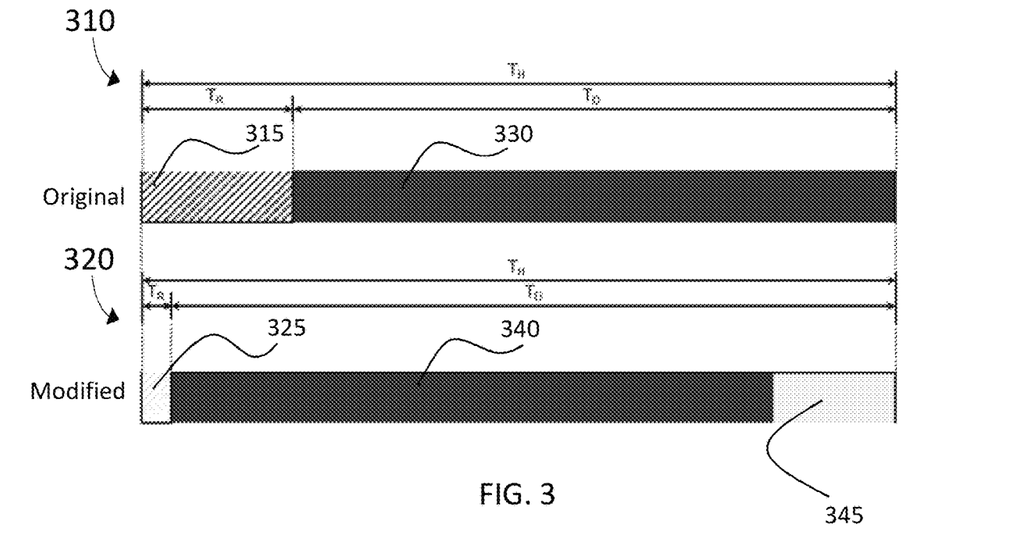
FIG. 3 provides illustrative waveform diagrams comparing an original frequency-hopping waveform with a modified waveform according to described embodiments.

Referring to FIG. 3, waveform diagrams of an original frequency-hopping waveform 310 (e.g., such as a SINCGARS waveform) in comparison to a modified waveform 320 are illustrated according to described embodiments. In an embodiment, the original frequency-hopping waveform 310 has a fixed retune period 315 having a time duration $T_R$ and a fixed dwell period 330 having a time duration $T_D$, resulting in waveform 310 having a total time duration of $T_H$.

The retune period 315 is a period of time during which a transmitter may change its transmit frequency (i.e. the period of time during which an output signal of a frequency hopping radio and the tuning of its corresponding receiver are synchronized and hop (or switch) over a range of frequencies in a pseudo-random manner.

The dwell period 330 (also sometimes referred to as a "dwell time" or more simply a "dwell") is a period of time during which a transmitter is "on" (i.e. transmitting a signal waveform) and its target receiver is "listening" (i.e. configured to receive a signal waveform). The dwell period is also sometimes referred to as a "hopping cycle."

In embodiments, modern communication devices can be adapted to retune much more rapidly than in devices available when such waveforms used by SINCGARS were originally developed. In an embodiment, a minimum retune period compatible among the communication devices is determined. In an embodiment, the minimum retune period is less than the original retune period 315. In an embodiment, a new retune period 325, shorter than the original retune period 315, is used to configure the new frequency-hopping waveform 320. In an embodiment, the new retune period 325 is equal to or greater than the minimum retune period.

Utilizing the new, shorter, retune period 325, a larger dwell period can be utilized with the new waveform 320 according to some embodiments. In an embodiment, the larger dwell period $T_D$ can be increased in length by up to a duration 345 corresponding to the difference between the original retune period 315 and the new retune period 325. It can be appreciated that an increased dwell duration $T_D$ may significantly improve communication throughput between the devices. In an embodiment, the increased dwell duration $T_D$ is about 20% or more.

Keeping the total waveform period the same or similar to that of the original SINCGARS waveform can provide for minimal change to the timing characteristics of the waveform and will generally be more compatible with existing hardware than a waveform of a different overall length. SINCGARS waveform length (with an inherent minimum/maximum dwell and hop rate) have also been well tested for robustness against jamming and for keeping data throughput at an acceptable level. It can be appreciated, of course, that the described methods and systems can be adapted to utilize different overall periods. Within some embodiments where the overall dwell period is increased, throughput with the modified waveform will be the same or greater in comparison to the original waveform.

Figure 4:
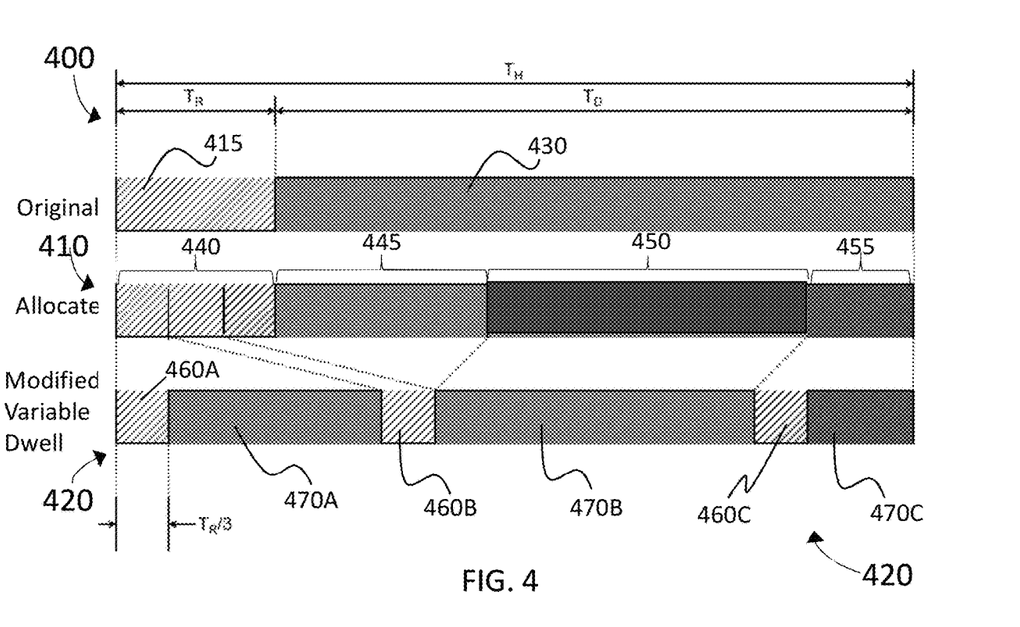
FIG. 4 provides illustrative waveform diagrams representing the modification of an original frequency-hopping waveform into a modified frequency-hopping waveform according to described embodiments.

Referring to FIG. 4, waveform diagrams representing the modification of an original frequency-hopping waveform into a modified frequency-hopping waveform are shown according to some embodiments. An original frequency-hopping waveform 400 has a fixed retune period 415 corresponding to a time duration $T_R$ and a fixed dwell period 430 corresponding to a time duration $T_D$, resulting in a waveform with a total time duration of $T_H$. In an embodiment, the minimum retune period of the communication devices within a network is determined to be equal to or less than a third of the original fixed retune period 415. Based on this determination, the original retune period 415 is reallocated as three shorter periods 440 as shown in an allocation waveform diagram 410. Similarly, the original dwell period 430 is reallocated as three shorter periods 445, 450 and 455 as shown in an allocation waveform diagram 410. The original retune and dwell periods are reallocated for performing three frequency hops 460A/470A, 460B/470B and 460C/470C illustrated in the new modified waveform 420.

In an embodiment, separate dwell periods 470A, 470B and 470C are distributed between retune periods 460A, 460B, and 460C. In embodiments, dwell periods 470A, 470B and 470C can be of equal or different durations (as shown). It can be of further appreciated advantage to vary the durations of dwell periods within a frequency-hopping waveform so as to reduce the probability of detection by a jamming system.

Figure 5:
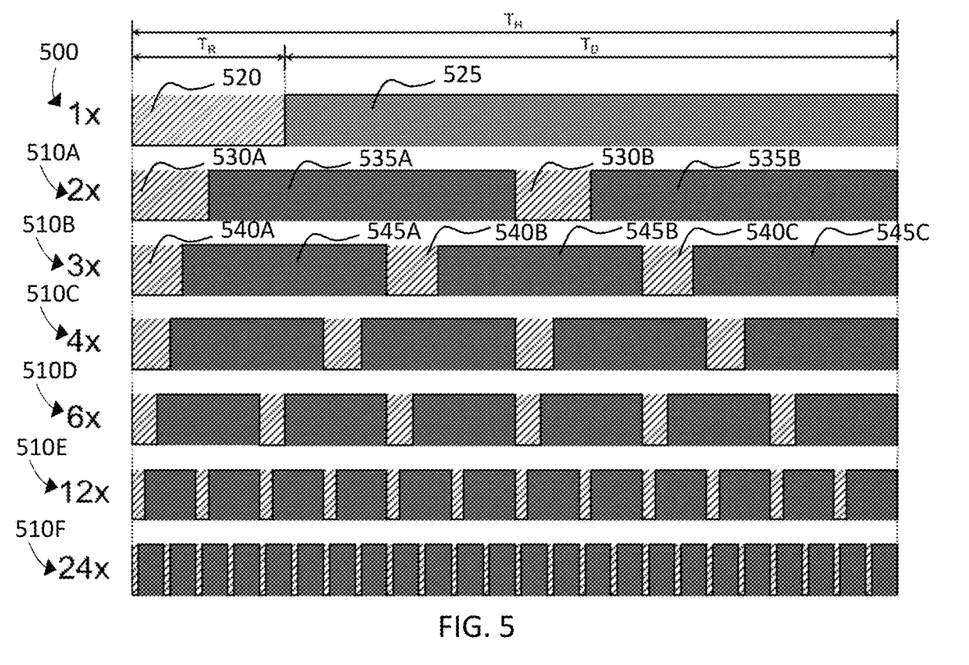
FIG. 5 provides illustrative waveform diagrams representing the modification of an original frequency-hopping waveform into modified frequency-hopping waveforms according to described embodiments.

Referring to FIG. 5, waveform diagrams illustrating example modifications of an original frequency-hopping waveform to provide modified frequency-hopping waveforms are shown according to described embodiments. An original frequency-hopping waveform 500 has a fixed retune period 520 corresponding to a time duration $T_R$ and a fixed dwell period 525 corresponding to a time duration $T_D$, resulting in a waveform with a total time duration of $T_H$.

Waveforms 510A, 510B, 510C, . . . , 510F represent waveforms with divisions of the original retune period 520 into two retune periods (530A, 530B) with two dwell periods (535A, 535B), three retune periods (540A, 540B, 540C) with three dwell periods (545A, 545B, 545C), and so on, up to a waveform 510F with 24 retune periods with 24 dwell periods respectively.

The original retune period can be divided so that each new retune period is of at least a minimum duration compatible with a retune time of at least some devices (and ideally with each device) within the communications network. In some embodiments, it can be appreciated that the number of retune periods added in comparison to the original retune period can be more than 24. In embodiments, retune periods and dwell periods need not be of equal length such as described above.

Figure 6:
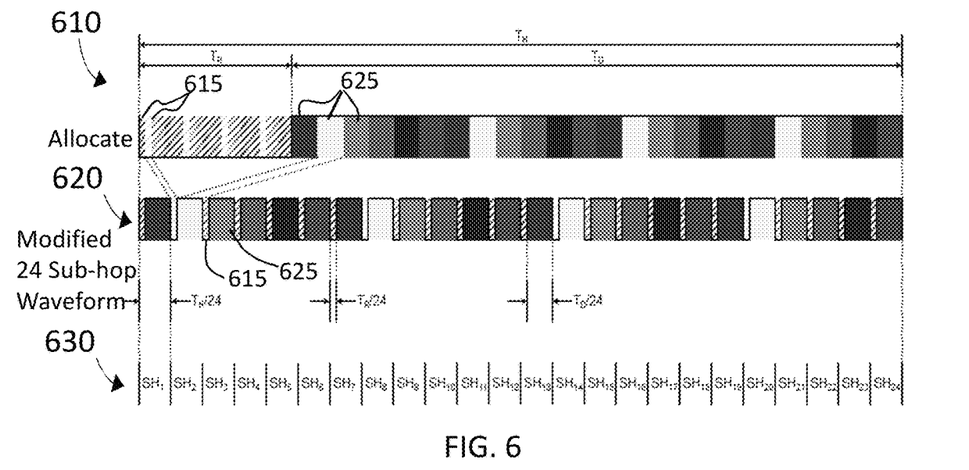
FIG. 6 provides illustrative waveform diagrams representing the modification of an original frequency-hopping waveform into a modified frequency-hopping waveform with multiple sub-hops according to described embodiments.

Referring to FIG. 6, waveform diagrams illustrating example modifications of an original frequency-hopping waveform to provide modified frequency-hopping waveforms with multiple sub-hops is shown according to described embodiments. A reallocation waveform diagram 610 of the original waveform 500 is shown as having the original retune period 520 and dwell period 525 reallocated into 24 sub-hops, with 24 retune periods 615 interspersed with 24 dwell periods 625. Thus, in this illustrative embodiment, each retune period 615 is of a duration $T_R/24$ and each dwell period 625 is of a duration $T_D/24$.

Figure 7:
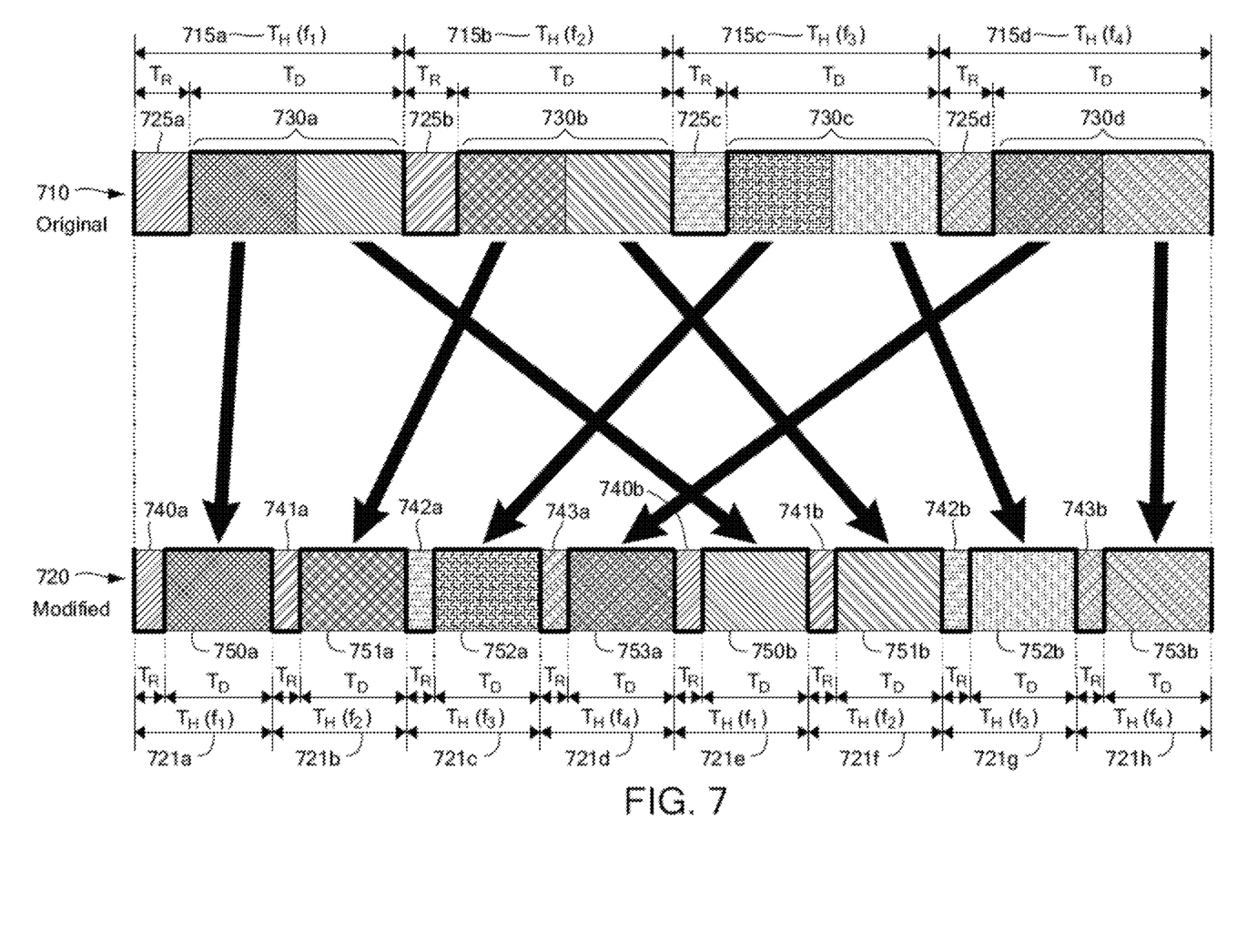
FIG. 7 provides illustrative waveform diagrams representing the modification of an original frequency-hopping waveform into a modified frequency-hopping waveform according to described embodiments.

Referring to FIG. 7, waveform diagrams of an original string (or sequence) of frequency-hopping waveforms 710 in comparison to a modified string of frequency hopping waveforms 720 are illustrated according to described embodiments.

The original string of frequency-hopping waveforms 710 includes waveforms 715a-d. Each of the waveforms 715a-d corresponds to, in this example, one of four distinct frequencies (e.g., $f_1$, $f_2$, $f_3$, and $f_4$). Additionally, each of the waveforms 715a-d has a hop time duration of $T_H$.

For devices to communicate, the hop time $T_H$ includes a fixed retune period $T_R$ such that the devices can synchronize communications over a frequency (e.g., one of frequencies $f_1$, $f_2$, $f_3$, and $f_4$). Once the devices are synchronized, information is passed to a receiving device during dwell duration $T_D$.

In embodiments, modern communications devices can be adapted to retune (e.g., synchronize for communications over a frequency) much more rapidly than in devices available when such waveforms used by SINCGARS were originally developed. In an embodiment, a modified waveform's minimum retune period is a fraction of (i.e., less than) the original retune period. Accordingly, a string of modified waveforms 720 can use the extra time to realize an increased hop rate and interleave synchronization.

For example, the string of modified waveforms 720 comprises a plurality of sub-hops 721a-h that are each a portion of one of the original waveforms 715a-d. Here, each original waveform 715a-d is divided into a pair of sub-hops. For example, original waveform 715a is divided into sub-hop 721a and sub-hop 721e; original waveform 715b is divided into sub-hop 721b and sub-hop 721f; original waveform 715c is divided into sub-hop 721c and sub-hop 721g; and original waveform 715d is divided into sub-hop 721d and sub-hop 721h. A skilled artisan understands that each of the original waveforms 715a-d can be divided into any number of sub-hops.

Each of the sub-hops 721a-h includes a retune period (e.g., one of 740a, 740b, 741a, 741b, 742a, 742b, 743a, or 743b) corresponding to a portion of the original fixed retune periods 725a-d. Additionally, each of the sub-hops 721a-h includes data that is a portion (e.g., one of 750a-b, 751a-b, 752a-b, and 753a-b) of original data 730a-d. As illustrated, each sub-hop's 721a-h retune period stays associated with a portion of the original data corresponding to the sub-hop's original waveform.

Here, since each original waveform 715a-d is divided into a pair of sub-hops, each of the portions 750a-b, 751a-b, 752a-b, and 753a-b is about 50% of its corresponding original portion. It should, of course, be appreciated that if each original waveform were divided into four sub-hops, each of the portions would be about 25% of its corresponding original portion and so-on and so-forth as the number of sub-hops into which the original waveform is introduced is increased.

Each of the sub-hops 721a-h that operate over a frequency (i.e., a frequency equivalent to the original waveform frequency from which the sub-hop is derived) is interleaved amongst sub-hops operating over different frequencies. In one example, interleaving is accomplished by time-dispersing each sub-hop operating over the same frequency such that no sub-hop is positioned next to a sub-hop operating over the same frequency.

Figure 8:
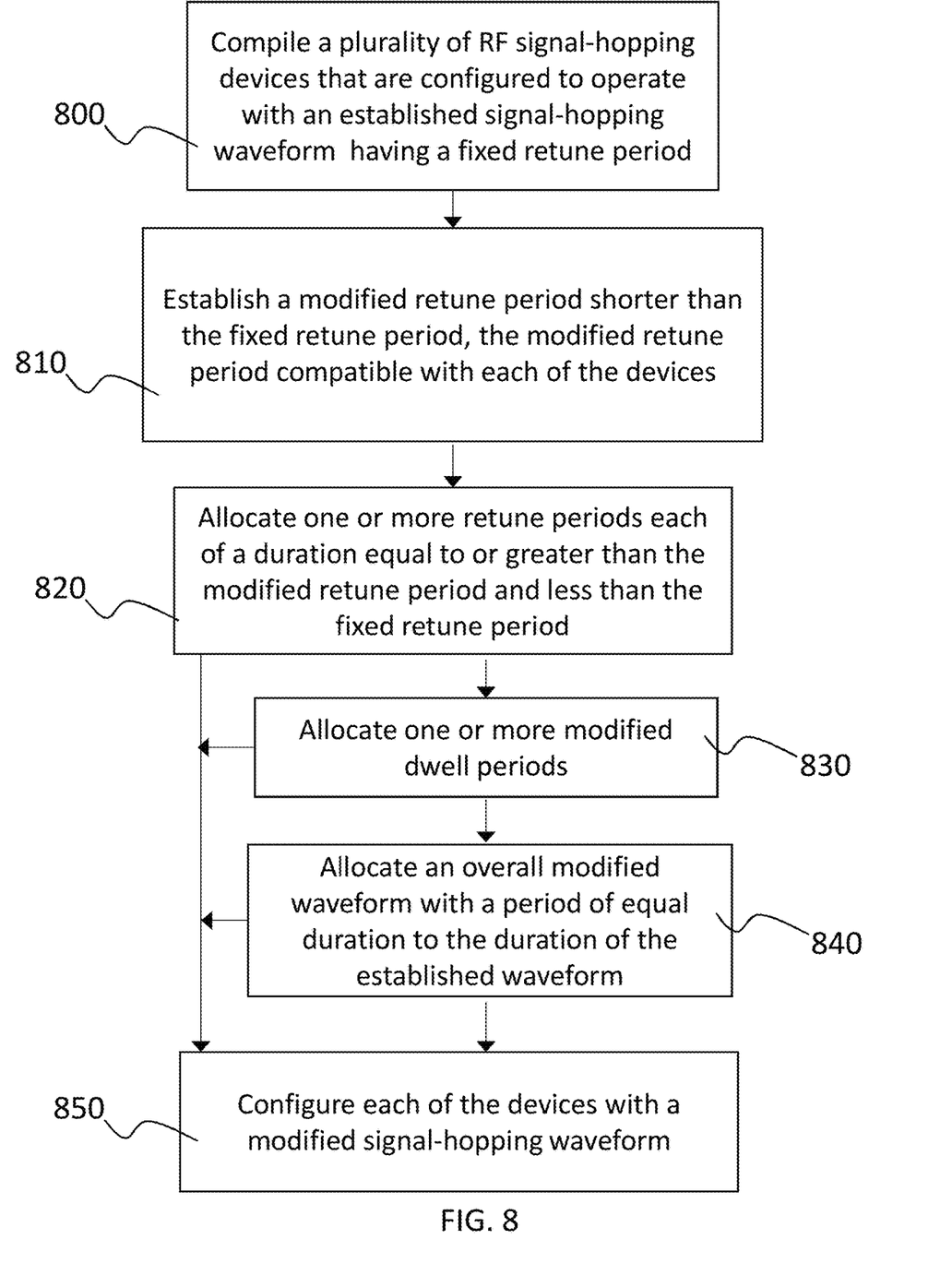
FIG. 8 is an illustrative block diagram of a method for modifying a frequency-hopping waveform according to described embodiments.
Figure 9:
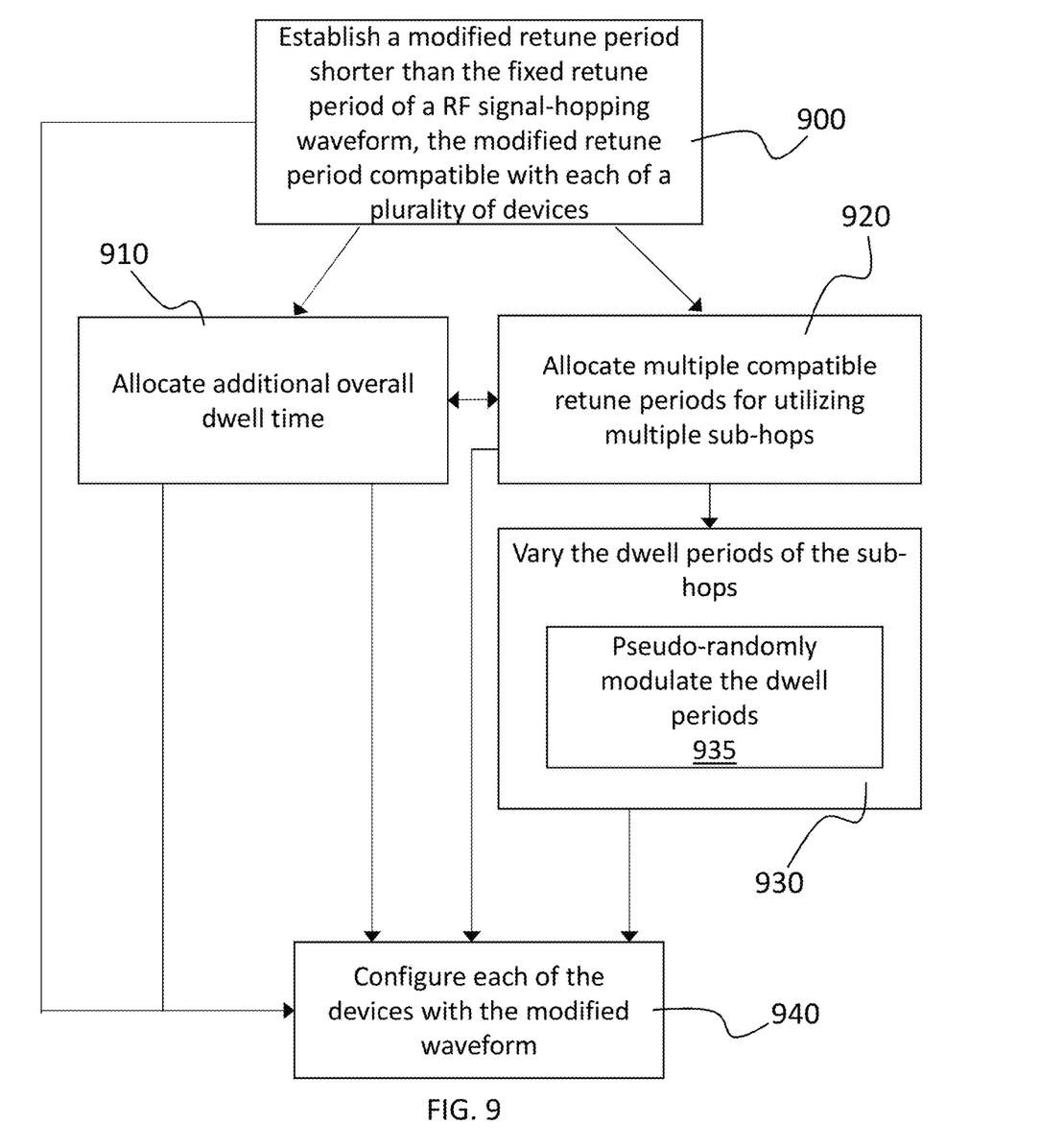
FIG. 9 is an illustrative block diagram of a method for modifying a frequency-hopping waveform according to described embodiments.

FIGS. 8 and 9 are a series of flow diagrams showing illustrative processing that can be implemented within an apparatus to communicate using a technique which takes advantage of transmitter and receiver tuning capability in a radio and, more particularly, within an appropriately modified SINCGARS radio, such as the illustrative system described above in conjunction with FIG. 1. Rectangular elements (typified by element 800), are herein denoted "processing blocks," and represent computer software instructions or groups of instructions. Alternatively, the processing blocks may represent steps or processes performed by functionally equivalent circuits such as a digital signal processor circuit or an application specific integrated circuit (ASIC). The flow diagram does not depict the syntax of any particular programming language, but rather illustrates the functional information one of ordinary skill in the art requires to fabricate circuits or to generate computer software to perform the processing described (e.g. the processing required of communication systems or devices (e.g. device 25 in FIG. 1 and/or system 1000 in FIG. 10). It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated, the blocks described below are unordered, meaning that, when possible, the functions represented by the blocks can be performed in any convenient or desirable order.

Referring to FIG. 8, an illustrative flow diagram of a method for modifying an established frequency-hopping waveform is shown according to embodiments. In an embodiment, a method includes, at block 800, compiling a collection of RF devices capable of frequency-hopping with the use of a fixed retuning period (e.g., compatible with SINCGARS). At block 810, a retune period of shorter duration than the fixed retuning period, and compatible with each of the devices, is established.

At block 820, one or more retune periods of shorter duration than the fixed retune period are allocated for a new modified waveform. At block 830, utilizing the shorter one or more retune periods, one or more modified dwell periods can optionally be allocated within the modified waveform. At block 840, the modified waveform can be configured to be of equal total duration as that of the original established waveform. In embodiments, the modified waveform can include one or more retune periods with one or more dwell periods such as exemplified in the waveform diagrams of FIGS. 3-6.

Based upon the allocated one or more retune periods and any newly allocated dwell periods, each of the devices is configured with a modified frequency-hopping waveform at block 850. Configuration can occur, for example, through a computer system (e.g., server) by way of one or more interfaces (e.g., network/cable connection) compatible with and capable of programming the devices with the modified frequency-hopping waveform. Examples of methods which can be used to reprogram parameters of communication signals (e.g., waveforms) are described, for example, in U.S. Pat. No. 5,425,051 entitled "Radio frequency communication network having adaptive parameters," the entire contents of which is herein incorporated by reference. Other general methods of modifying the parameters of communication devices will be known to those of ordinary skill in the art.

Once each of the devices is configured with the modified waveform, they can utilize the waveform to communicate with each other such as, for example, over RF frequencies. In embodiments, some devices can be programmed/updated with modified waveforms in an automatic fashion (e.g., via a network connection or utilizing communications utilizing the modified waveform) and some can incorporate and/or switch between multiple waveforms such as for use across multiple assortments of devices.

Referring to FIG. 9, an illustrative flow diagram of a method for modifying an established frequency-hopping waveform according to described embodiments is shown. In an embodiment, the established frequency-hopping waveform has a retune period of fixed duration (e.g., SINCGARS). At block 900, a minimum modified retune period for frequency-hopping is determined which is compatible with each of a plurality of communication devices (e.g., SINCGARS RF communication devices) and shorter than the fixed retune period of the original waveform. Utilizing the modified retune period as a basis, a new modified waveform can be allocated with additional dwell duration (compared to the dwell duration of the established waveform) at block 910 and/or multiple retune periods (sub-hops) at block 920 that can be allocated for the new modified waveform.

In embodiments of modified waveforms with added sub-hops, the dwell periods between sub-hops can be varied at block 930 and subsequently configured into various devices at block 940. It can be appreciated that varied dwell periods between sub-hops can make detection and subsequent jamming of communications more difficult.

In an embodiment, the variation of dwell periods between sub-hops can be varied or modulated in a pseudo-random manner at block 935. In an embodiment, each of the devices is preconfigured with a pseudo-random function which is used to generate a pseudo-random sequence of dwell periods. For example, in an embodiment, a value that represents a random seed is conveyed at block 940 along with remaining parameters of a modified waveform to the devices, to be subsequently utilized during waveform communications with a pseudo-random sequence of dwell periods. It can be appreciated by one of ordinary skill in the art that numerous types of pseudo-random sequence schemes are available and can be utilized for modulating the width of dwell periods, such as adapted, for example, from known systems configured for secure encrypted communications.

Figure 10:
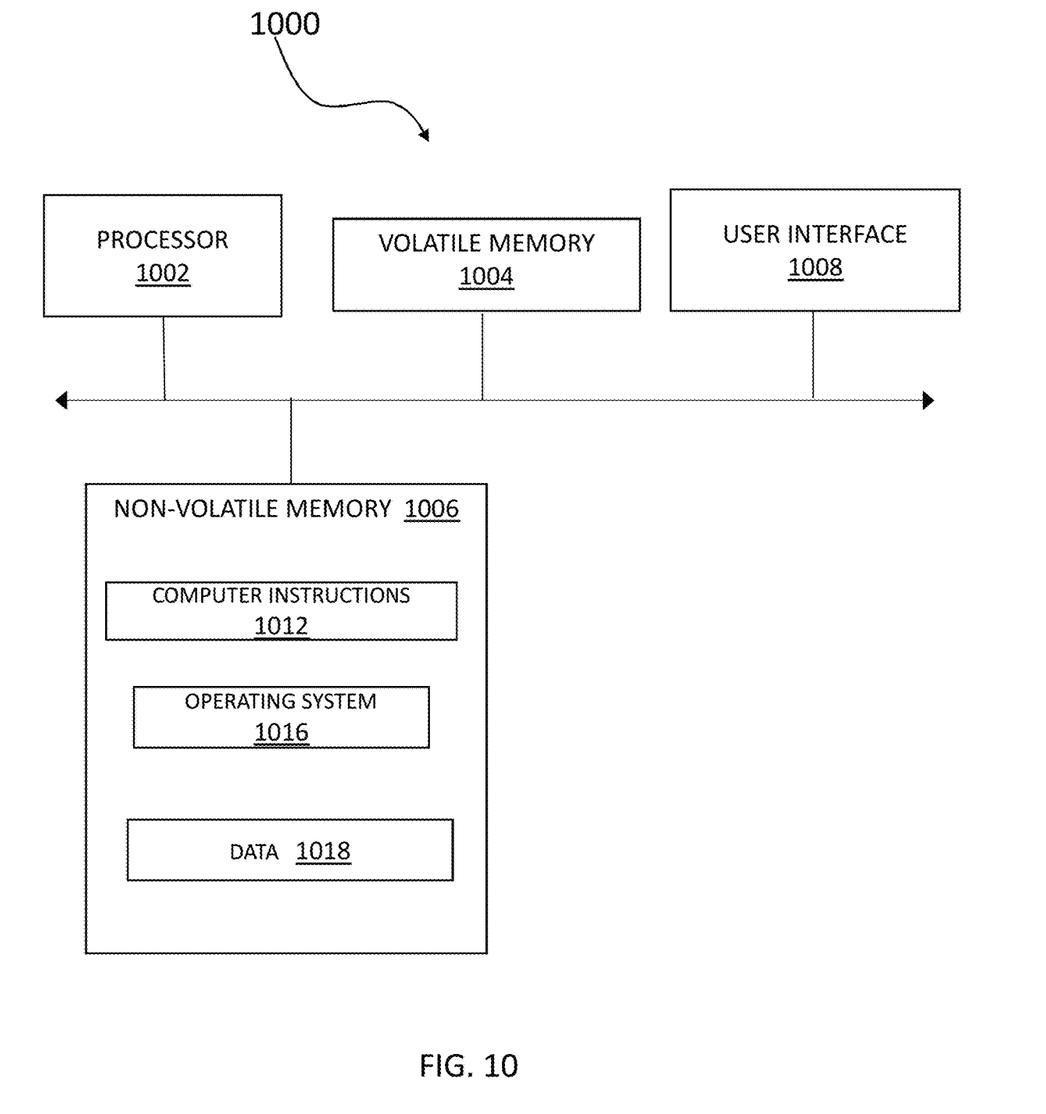
FIG. 10 is an illustrative block diagram of a computer system/processor for programming and configuring a frequency-hopping waveform according to described embodiments.

Referring to FIG. 10, an illustrative block diagram of an embodiment is provided of a computer system/controller 1000 for configuring devices with a modified frequency-hopping waveform, such as the computer system 50 shown and described in reference to FIG. 2. A computer system 1000 includes a processor 1002, a volatile memory 1004, a non-volatile memory 1006 (e.g., hard disk) and a user interface (UI) 1008 (e.g., a graphical user interface, a mouse, a keyboard, a display, touch screen and so forth). The non-volatile memory 1006 stores computer instructions 1012, an operating system 1016 and data 1018. In one example, the computer instructions 1012 are executed by the processor 1002 out of volatile memory 1004 to perform all or part of the processes described herein (e.g., processes illustrated and described in reference to FIGS. 3 through 9).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include but is not limited to an ASIC, an FPGA, a DSP and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 8 and 9 are not limited to the specific processing order illustrated. Rather, any of the processing blocks of FIGS. 8 and 9 may be re-ordered, combined or removed, performed in parallel or in serial, as necessary, to achieve the results set forth above.

The processing blocks (for example, of FIGS. 8 and 9) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might be made by those skilled in the art without departing from the scope of the following claims.

The invention claimed is:

1. A method comprising:
   a) assembling a network of radio frequency (RF) frequency-hopping devices in a network of devices configured with an original string of multiple waveforms, wherein each waveform operates on a distinct frequency and comprises a fixed retuning period and a dwell period; and
   b) reprogramming the frequency-hopping devices with a modified string of waveforms, wherein generating the modified string of waveforms comprising:
      i. dividing each waveform of the original string into two or more sub-hops, wherein each sub-hop includes a portion of the fixed retuning period and a portion of the dwell period, and
      ii. interleaving each sub-hop such that sub-hops operating on a same frequency are time-dispersed.

2. The method of claim 1 wherein a combination of at least two sub-hops has an overall duration equivalent to that of a single waveform of the string of original waveforms.

3. The method of claim 1 wherein each sub-hop comprises a synchronization preamble have a length corresponding to a number of divisions of each waveform of the original string.

4. The method of claim 1 wherein information transmitted in the dwell period of an original waveform is divided such that each division is interleaved with one of the dwell portions of each of the two or more sub-hops operating on the same frequency.

5. The method of claim 4 wherein the information is time-dispersed with each of the two or more sub-hops operating on the same frequency.

6. The method of claim 1 wherein each waveform of the original string of multiple waveforms is a waveform of a Single Channel Ground and Airborne Radio System (SINCGARS).

7. A system comprising:
   a) a network of radio frequency (RF) frequency-hopping devices in a network of devices configured with an original string of multiple waveforms, wherein each waveform operates on a distinct frequency and comprises a fixed retuning period and a dwell period; and
   b) a controller configured to reprogram the frequency-hopping devices with a modified string of waveforms, wherein the controller generates the modified string of waveforms by:
      i. dividing each waveform of the original string into two or more sub-hops, wherein each sub-hop includes a portion of the fixed retuning period and a portion of the dwell period, and ii. interleaving each sub-hop such that sub-hops operating on a same frequency are time-dispersed.

8. The system of claim 7 wherein a combination of at least two sub-hops has an overall duration equivalent to that of a single waveform of the string of original waveforms.

9. The system of claim 7 wherein each sub-hop comprises a synchronization preamble have a length corresponding to a number of divisions of each waveform of the original string.

10. The system of claim 7 wherein information transmitted in the dwell period of an original waveform is divided such that each division is interleaved with one of the dwell portions of each of the two or more sub-hops operating on the same frequency.

11. The system of claim 10 wherein the information is time-dispersed with each of the two or more sub-hops operating on the same frequency.

12. The system of claim 7 wherein each waveform of the original string of multiple waveforms is a waveform of a Single Channel Ground and Airborne Radio System (SINCGARS).

* * * * *